United States Patent [19]

Elliston

[11] 4,390,315
[45] Jun. 28, 1983

[54] FIRE FIGHTING BOOM ASSEMBLY FOR SERVICE VESSEL

[75] Inventor: Thomas L. Elliston, Fort Worth, Tex.

[73] Assignee: Hydra Rig Incorporated, Fort Worth, Tex.

[21] Appl. No.: 213,778

[22] Filed: Dec. 8, 1980

Related U.S. Application Data

[63] Continuation of Ser. No. 907,046, May 18, 1978, Pat. No. 4,285,629.

[51] Int. Cl.$^3$ .............................................. B66C 1/42
[52] U.S. Cl. ..................................... 414/740; 169/69; 212/192; 212/266; 294/104; 414/690; 414/727; 414/728
[58] Field of Search ............... 414/690, 691, 692, 722, 414/727; 212/190, 192, 264, 266–269; 52/115–118; 169/69

[56] References Cited

U.S. PATENT DOCUMENTS

| | | | |
|---|---|---|---|
| 304,040 | 8/1884 | Snee | 212/190 |
| 1,234,304 | 7/1917 | Dolan | 414/692 |
| 1,412,922 | 4/1922 | Collatz | 414/690 |
| 2,462,926 | 3/1949 | Wilson et al. | 212/231 X |
| 3,129,831 | 4/1964 | Mrozek | 414/692 |
| 3,347,586 | 10/1967 | Sharp | 294/104 X |
| 3,390,657 | 7/1968 | Schneider | 212/192 X |
| 3,481,490 | 12/1969 | Eiler | 212/269 |
| 3,863,406 | 2/1975 | Quick | 212/268 X |
| 4,171,597 | 10/1979 | Lester et al. | 212/269 X |

OTHER PUBLICATIONS

"RED 1–A New Offshore Fire Fighting Concept" by Red Adair & D. S. Hamett, Pub. by Offshore Technology Conference, Paper No. OTC-1971, Conference held May 6–8, 1974.

*Primary Examiner*—Leslie J. Paperner
*Attorney, Agent, or Firm*—Hubbard, Thurman, Turner & Tucker

[57] ABSTRACT

An extendable utility boom assembly for assisting firefighting operations performed from a semi-submersible service vessel upon an offshore platform is disclosed. The boom assembly is moved to operating position by means of a carriage assembly which is mounted for movement along a track secured to the deck of the service vessel. Orientation of the boom assembly in azimuth and pitch is provided by a supporting frame which is pivotally mounted on the carriage assembly for angular movement through a horizontal plane, and a trunnion which is pivotally mounted on the supporting frame for angular movement through a vertical plane. An elongated utility boom is supported by roller bearing elements for axial movement through the trunnion. A first linear actuator is interconnected between the carriage assembly and supporting frame for displacing the supporting frame through the horizontal plane. A second linear actuator is interconnected between the trunnion and the carriage assembly for displacing the trunnion through the vertical plane, and a third linear actuator is interconnected between the boom and the trunnion for displacing the boom along the axis of the trunnion. The elongated utility boom is characterized by a polygon in transverse section, with the aft section of the boom being substantially constant in diameter along its length, and the forward section of the boom being tapered in diameter along its length. This particular configuration provides a high strength-to-weight ratio and can withstand the high operating temperatures encountered during fire fighting operations.

6 Claims, 13 Drawing Figures

FIRE FIGHTING BOOM ASSEMBLY FOR SERVICE VESSEL

This is a continuation of application Ser. No. 907,046, filed May 18, 1978, now U.S. Pat. No. 4,285,629.

BACKGROUND OF THE INVENTION

1. Field of the Invention

The present invention is related generally to utility service equipment for assisting firefighting operations, and in particular to an extendable boom assembly which may be operated from the service deck of a semi-submersible service vessel for assisting offshore platform firefighting operations.

2. Description of the Prior Art

As energy demands increase, so does the need to explore and produce petroleum from offshore areas in deep and rough waters. Of vital concern to such offshore petroleum production operations is the need for adequate measures to be taken to minimize the effects of blowouts, fires and spills. There is a continuing interest in the advancement of concepts and equipment to adequately handle such offshore disasters in the rougher and deeper waters of the world.

Of particular concern is the possibility of a fire occuring on an offshore platform in relatively deep and rough waters. Such fires burn so intensely that the offshore derrick and associated equipment collapse and fuse together in a molten mass around the fire. In order to extinguish the fire, it is necessary to remove the collapsed structure to make room for the placement of an explosive charge which is subsequently detonated to blow out the fire. Because such fires burn so intensely, for example at temperatures of 2000° Fahrenheit and above, it is not safe for personnel or a service vessel to approach the platform closely enough to carry out firefighting operations.

According to a recent invention, a semi-submersible service vessel has been developed which is capable of assisting firefighting operations on offshore platforms. Such a vessel is disclosed and claimed by the co-pending U.S. application No. 845,831 filed Oct. 31, 1977, now U.S. Pat. No. 4,281,615, and entitled "Self-Propelled Semi-Submersible Service Vessel." The object of the present invention is to disclose the proprietary details of an extendable utility boom assembly which can be operated safely and effectively from the deck of such a service vessel for assisting firefighting operations carried out on an offshore platform.

SUMMARY OF INVENTION

An extendable utility boom assembly for assisting firefighting operations performed upon an offshore platform is disclosed. The extendable boom assembly is particularly well suited for operation from a semi-submersible service vessel of the type including a service deck from which marine service operations may be performed. In its broadest aspects, the extendable fire boom assembly includes an elongated truss which is extendable relative to the deck, and an elongated boom which is extendable relative to the truss. A track is secured to the deck of a service vessel for guiding the movement of the extendable truss from a stowed position to an operating position. A track is secured to the truss for guiding the movement of a carriage assembly along the length of the truss. Orientation of the boom assembly in azimuth and pitch is provided by a supporting frame which is pivotally mounted on the carriage assembly for angular movement through a horizontal plane, and a trunnion which is pivotally mounted on the supporting frame for supporting the elongated boom in angular movement through a vertical plane. The trunnion includes wall portions defining a central axial passageway in which an aft boom section is disposed and from which a forward boom section projects for reaching a desired location on an offshore platform. A first linear actuator is interconnected between the carriage assembly and supporting frame for displacing the supporting frame through the horizontal plane. A second linear actuator interconnects the carriage assembly and trunnion for displacing the elongated boom through the vertical plane. A third linear actuator interconnects the trunnion and boom for displacing the utility boom along the axis of the trunnion.

According to an important feature of the invention, the elongated utility boom comprises a number of elongated panels having side portions assembled together in edge abutting relation thereby defining a panel assembly which is characterized by a polygon in transverse section. The elongated boom comprises a first boom section which is substantially constant in diameter along its length and a second boom section which is tapered in diameter along its length. It has been determined that this particular structural arrangement has a high strength-to-weight ratio for handling heavy loads, and its polygon configuration provides rapid and uniform heat dissipation for operation in high temperature environments.

According to yet another important feature of the invention, a utility claw assembly is mounted on an end portion of the elongated boom for rotation about the longitudinal axis of the boom. The utility claw includes a fixed jaw, a moveable jaw having a lever portion mounted for pivotal movement relative to the fixed jaw, and a moveable draw bar coupled to the claw assembly for displacing the moveable jaw relative to the fixed jaw. A draw tube is disposed within the utility boom and mechanically connects the moveable jaw to a linear actuator for displacing the moveable jaw relative to the fixed jaw. The draw tube is also coupled to a rotary actuator for displacing the utility claw assembly about the longitudinal axis of the boom assembly. An improved linking mechanism is provided for efficiently transforming the linear motion of the draw bar into rotary movement of the moveable jaw as it transmits a shearing force to an object seized between the fixed and moveable jaws.

The novel features which characterize the invention are defined by the appended claims. The foregoing and other objects, advantages and features of the invention will hereinafter appear, and for purposes of illustration of the invention, but not of limitation, an exemplary embodiment of the invention is shown in the appended drawing.

DESCRIPTION OF THE PREFERRED EMBODIMENT

In the description which follows, like parts are marked throughout the specification and drawing with the same reference numerals respectively.

Referring now to the drawing, and in particular to FIGS. 1-4, the invention is shown in combination with a self-propelled semi-submersible column stabilized service vessel 10 the general features of which are described in detail in the co-pending U.S. application Ser. No. 845,831, filed Oct. 31, 1977, entitled "Self-Propelled Semi-Submersible Service Vessel," which is hereby incorporated by reference. The service vessel 10 is a twin-hulled, column stabilized, self-propelled semi-submersible type utility service vessel which is properly constructed and equipped for extended operations in relatively deep and rough waters such as the North Sea production fields.

Figure 1:
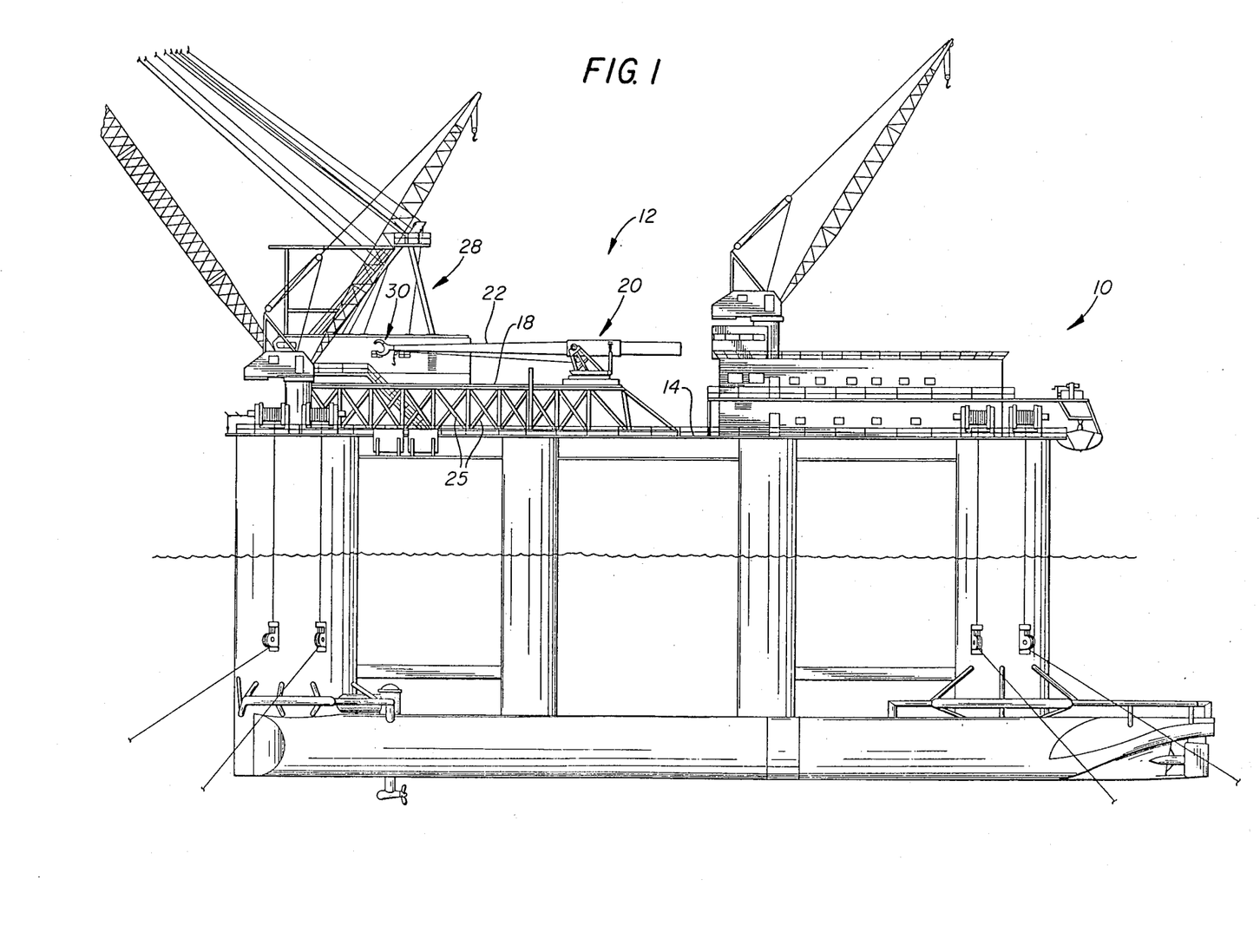
FIG. 1 is a port profile elevation view of a semi-submersible service vessel on which an extendable fire boom assembly constructed according to the teachings of the present invention is mounted.
Figure 2:
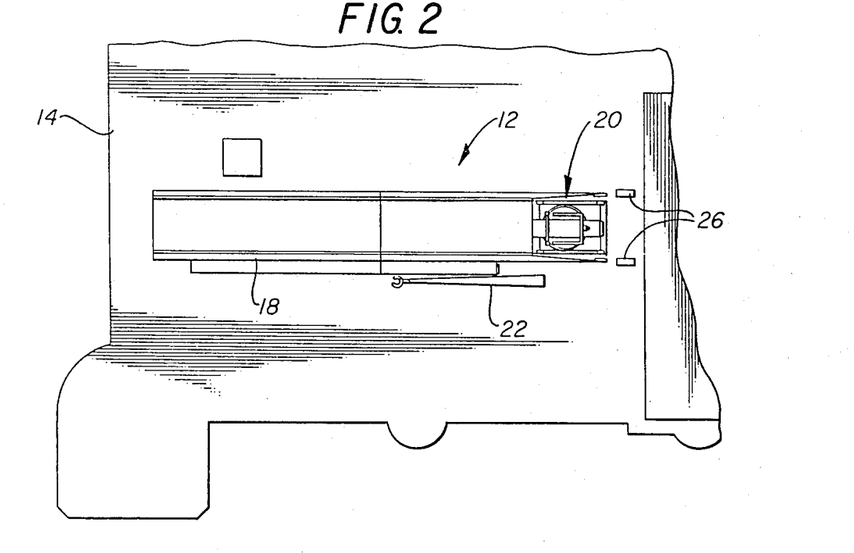
FIG. 2 is a partial plan view of the main deck of the semi-submersible service vessel shown in FIG. 1 in which the extendable fire boom assembly is disposed in a stowed position.
Figure 3:
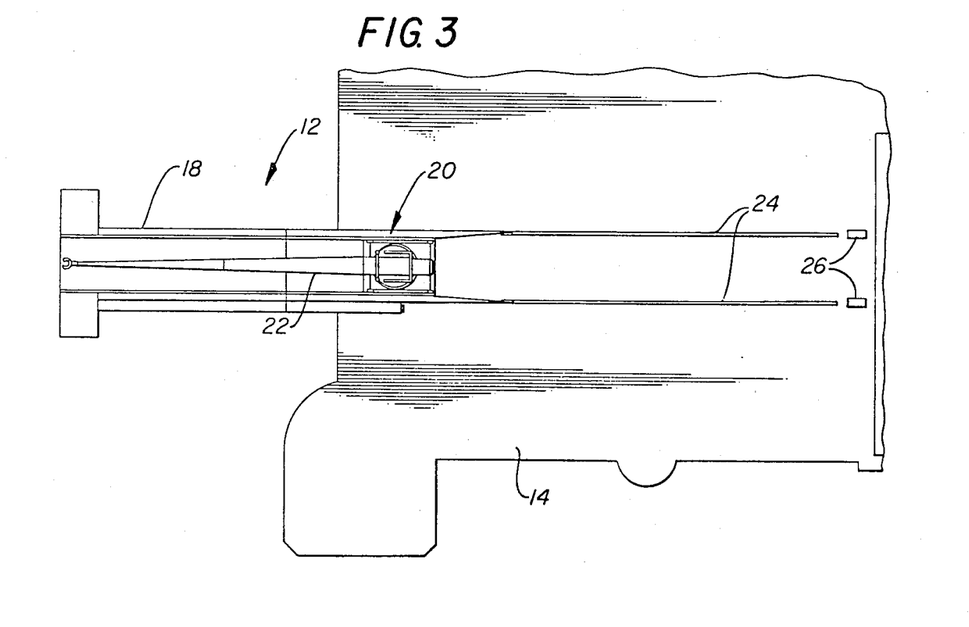
FIG. 3 is a plan view similar to FIG. 2 in which the extendable truss of the fire boom assembly is disposed in operating position.
Figure 4:
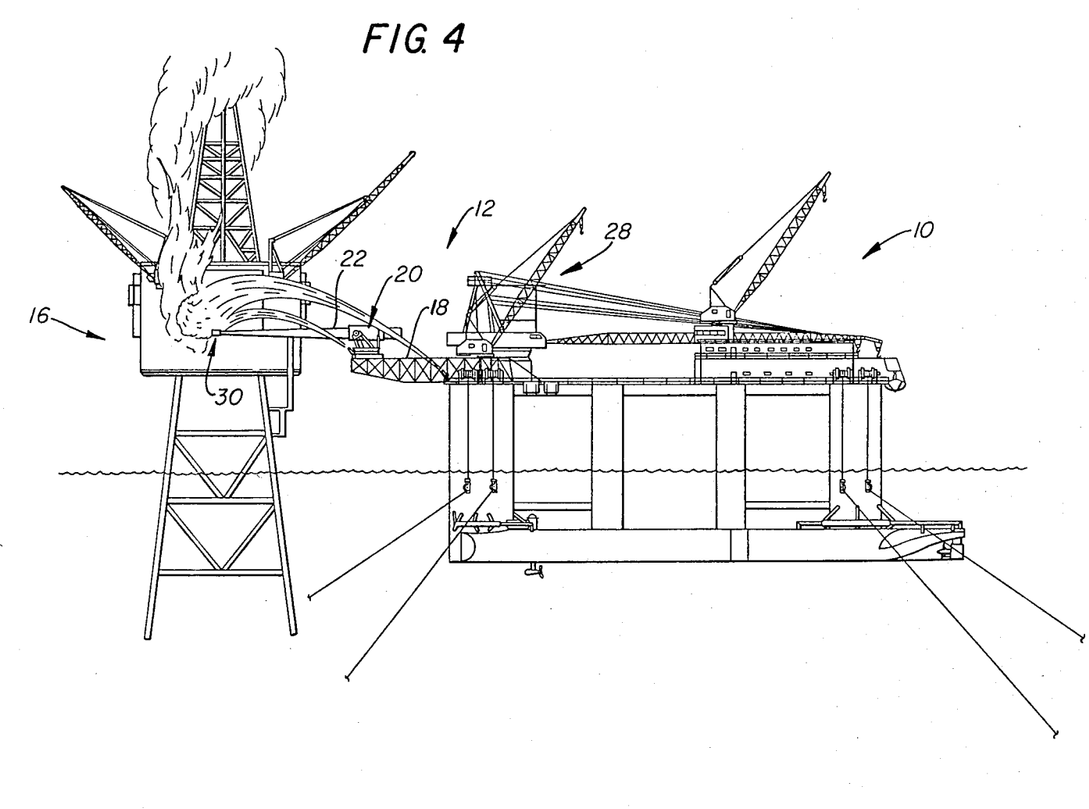
FIG. 4 is a port profile elevation view similar to FIG. 1 in which the semi-submersible service vessel is moored adjacent an offshore platform and the extendable fire boom assembly is fully extended in operating position for assisting a firefighting operation.

An extendable fire boom assembly 12 is shown in a stowed position upon a service deck 14 in FIGS. 1 and 2, in an intermediate position in FIG. 3, and in a fully extended operating position adjacent an offshore platform 16 in FIG. 4. The extendable boom assembly 12 includes an extendable truss 18, a fire vehicle 20 and an extendable fire arm or boom 22. The extendable truss 18 is mounted for guided movement upon parallel rails 24 which are secured to the service deck 14 for supporting the extendable truss over the forward edge of the service vessel 10. The extendable truss 18 comprises a number of cross-brace members 25 in tension and compression according to conventional construction. Parallel tracks 27 (FIGS. 5 and 7) mounted along the top of the extendable truss 18 supports movement of the fire vehicle 20 relative to the extendable truss. The extendable truss 18 is propelled across the service deck 14 by means of hydraulic skid jacks 26, and the fire vehicle 20 is propelled by means of a hydraulic drive assembly as discussed below.

According to a preferred procedure for extending the boom assembly 12, the truss 18 is extended along the tracks 24 by operation of the hydraulic skid jacks 26 to a desired position forward as shown in FIG. 3. Tie-down bolts (not shown) are installed through a skid girder flange at the aft end. Thereafter, the fire boom 22 is lifted from its stowed position as shown in FIG. 2 by means of a revolvable crane 28 and is placed in position and bolted in place on the fire vehicle 20. After the initial setup, the fire boom 22 is fully retracted to the position shown in FIG. 3 before changing the position of the extendable truss 18.

The extendable boom assembly 12 is designed to operate extended thirty to eighty feet forward of the bow. After the extendable truss 18 has been jacked forward along the tracks 24 to its desired position, and has been bolted in place, the fire vehicle 20 may be moved along tracks 27 toward the forward end of the fire boom. The fire vehicle 20 can be operated at any position along the truss 18. The extendable fire boom assembly is cooled at all times with a water spray when it is near a fire, as is shown in FIG. 4.

According to an important feature of the invention, the extendable fire boom 22 is provided with a utility claw assembly 30 which is attached to the remote end of the boom for forcibly removing pieces of the burning or damaged structure, for positioning control valves, or for placing explosive charges. When using the fire boom assembly 12 for positioning explosives, the claw is preferably removed from the end of the boom 22 and a bar (not shown) is welded onto the end of the arm to support the explosive charge.

Figure 6:
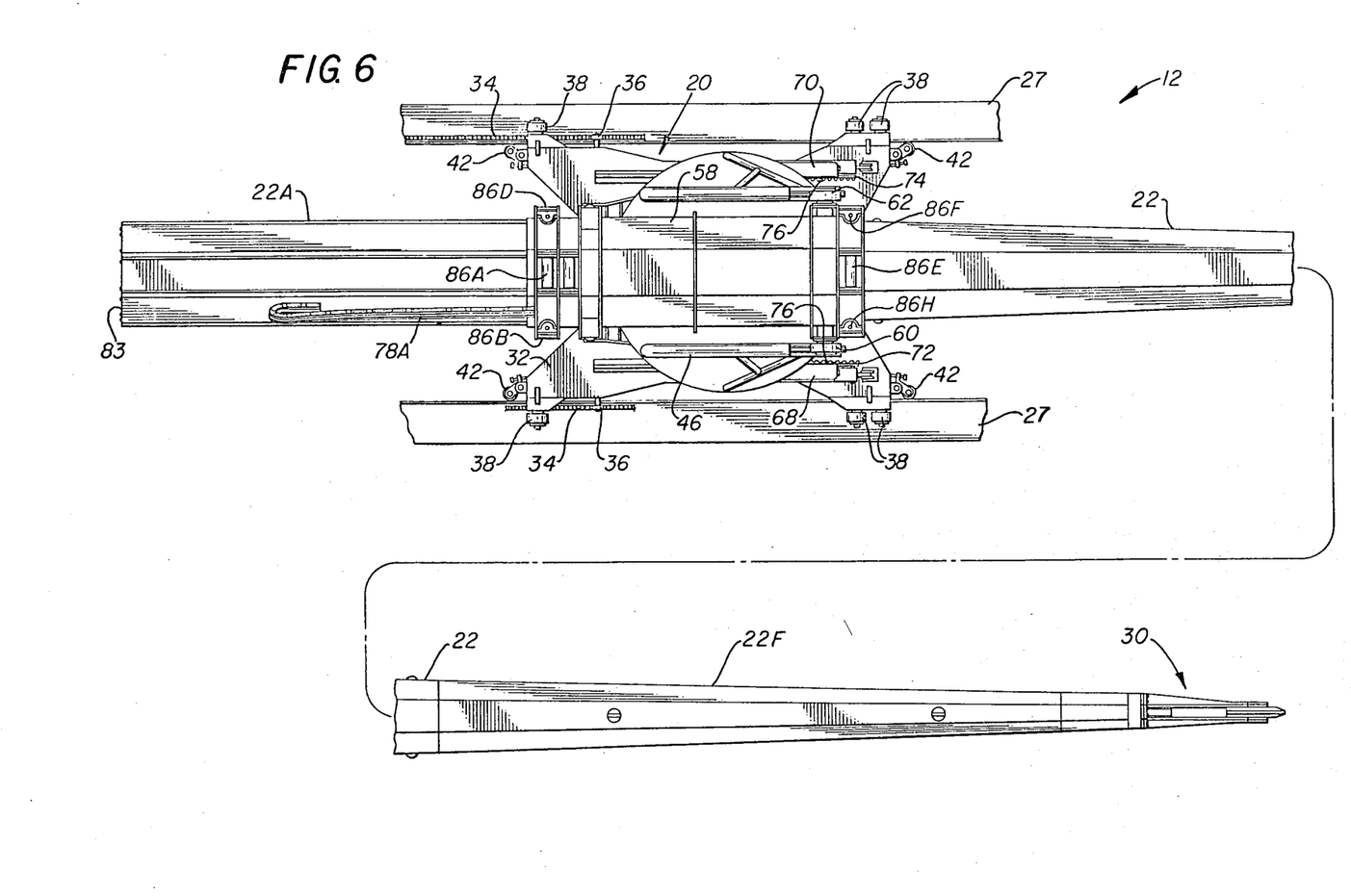
FIG. 6 is a top plan view of the extendable fire boom assembly shown in FIG. 5.
Figure 7:
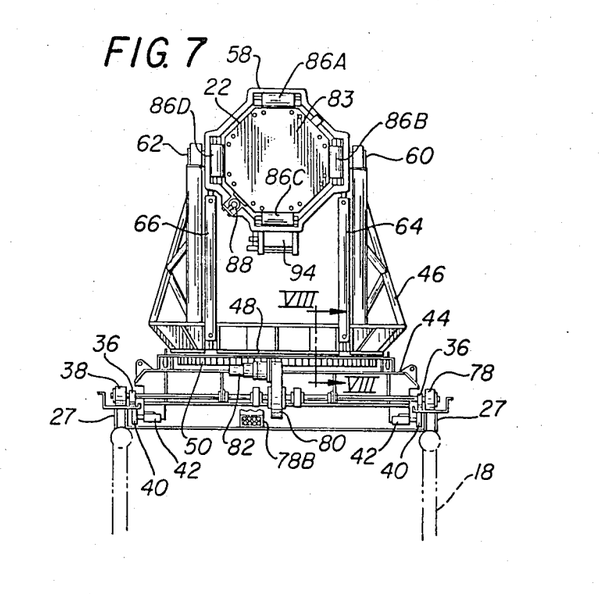
FIG. 7 is an aft elevation view, partly in section of the extendable fire boom assembly of FIG. 5.
Figure 8:
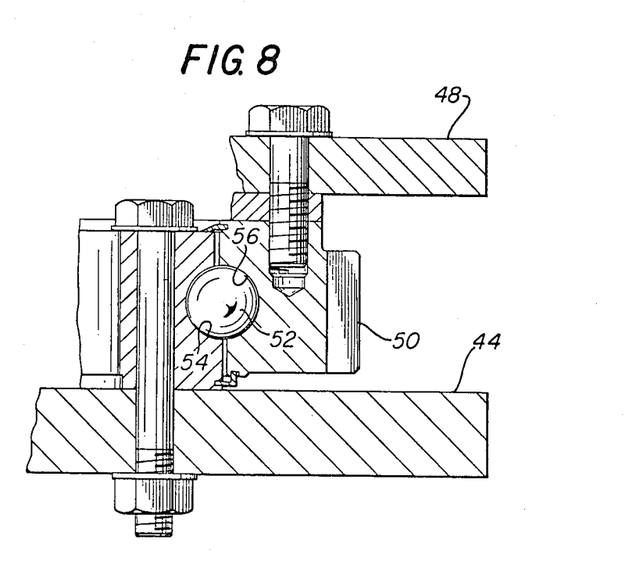
FIG. 8 is a sectional view taken along the lines VIII—VIII of FIG. 7.

Referring now to FIGS. 5, 6, 7 and 8, the construction of the extendable fire boom assembly 12 is illustrated in detail. The extendable truss includes the rails 27 for guiding the movement of a trolley or carriage assembly 32. The rails 27 are preferably provided with teeth 34 which are engaged by a rotating drive wheel 36 carried on the trolley 32. Motion of the carriage assembly 32 is stabilized by means of upper and lower rowers 38, 40 respectively, and by means of side load rollers 42. The stability rollers are mounted on a trolley weldment 44 on which a support frame 46 is mechanically coupled for pivotal rotation through a horizontal plane to permit movement of the extendable fire boom 22 from one azimuth position to another. The support frame 46 is mounted on a gear weldment 48 on which a circular gear having teeth 50 has been machined. The gear plate weldment 48 is supported for rotational movement upon the trolley weldment 44 by means of a number of ball bearings 52 which permit rolling movement within circular raceways 54, 56 which are aligned to define a continuous annular raceway extending around the gear plate 48 as illustrated in FIG. 8 of the drawing.

A trunnion 58 is pivotally supported on the support frame 46 by trunnion shafts 60, 62 for angular movement through a vertical plane to permit the pitch of the extendable fire boom 22 to be varied in relation to the support frame 46. A pair of hydraulic linear actuators 64, 66 are connected intermediate the support frame 46 and trunnion 58 for controlling the angular movement of the trunnion 58 as it is displaced through its vertical plane of rotation. The support frame 46 is likewise displaced through its horizontal plane of rotation by means of a pair of hydraulic linear actuators 68, 70 which are operably connected to first and second rotate drive assemblies 72, 74 each of which having teeth 76 meshed with the teeth 50 of the gear weldment 48 for controlling the azimuth position of the support frame 46 relative to the carriage assembly 32. Pressurized hydraulic fluid for actuating the linear and rotary actuators is conveyed by means of a hose chain assembly 78A. A hose chain assembly 78B is connected to the carriage assembly 32 and supplies hydraulic fluid to hydraulic drive equipment such as a trolley drive assembly 80 which is powered by a hydraulic motor 82.

Figure 5:
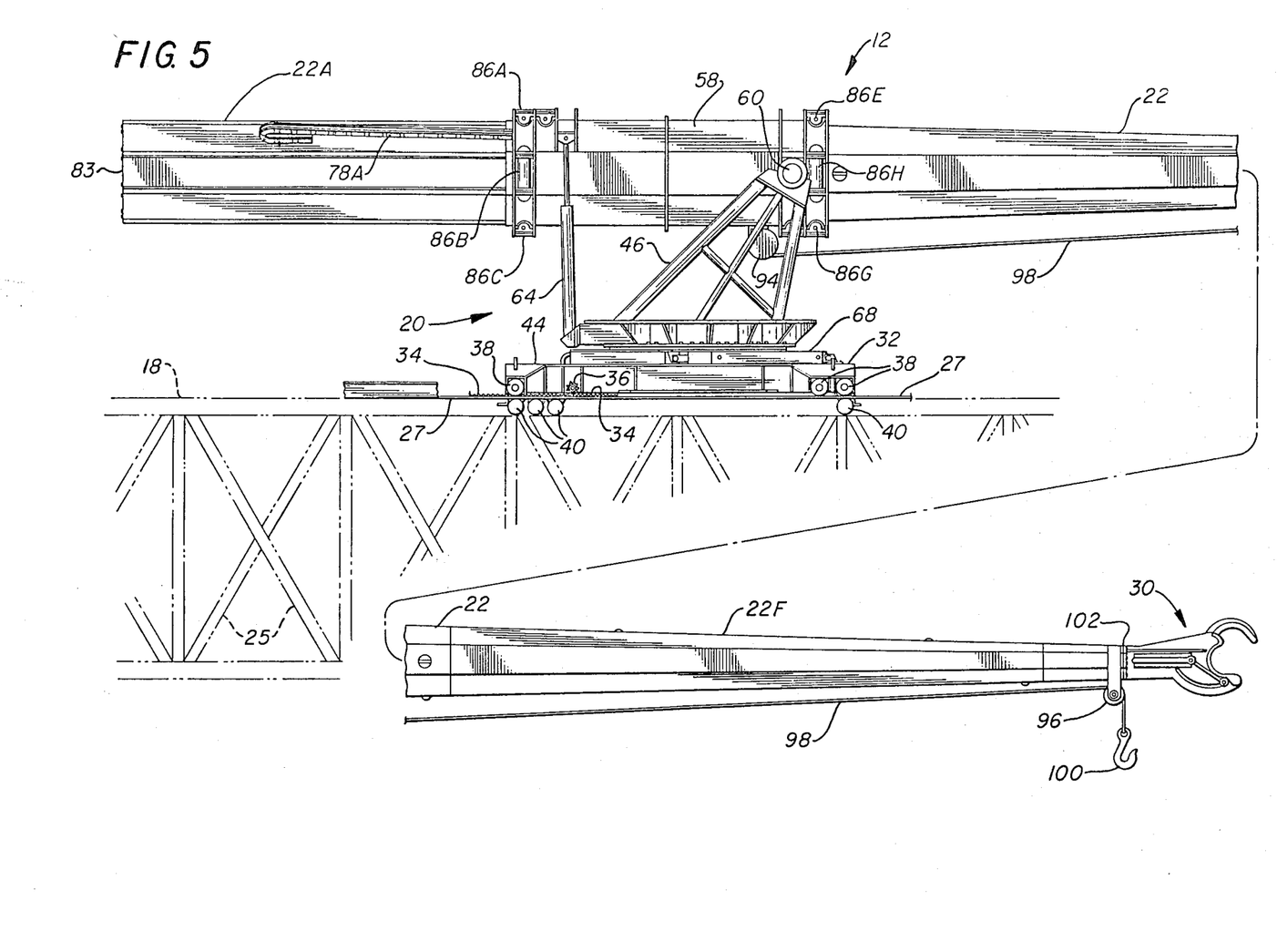
FIG. 5 is a side elevation view of the extendable fire boom assembly of the invention.
Figure 9:
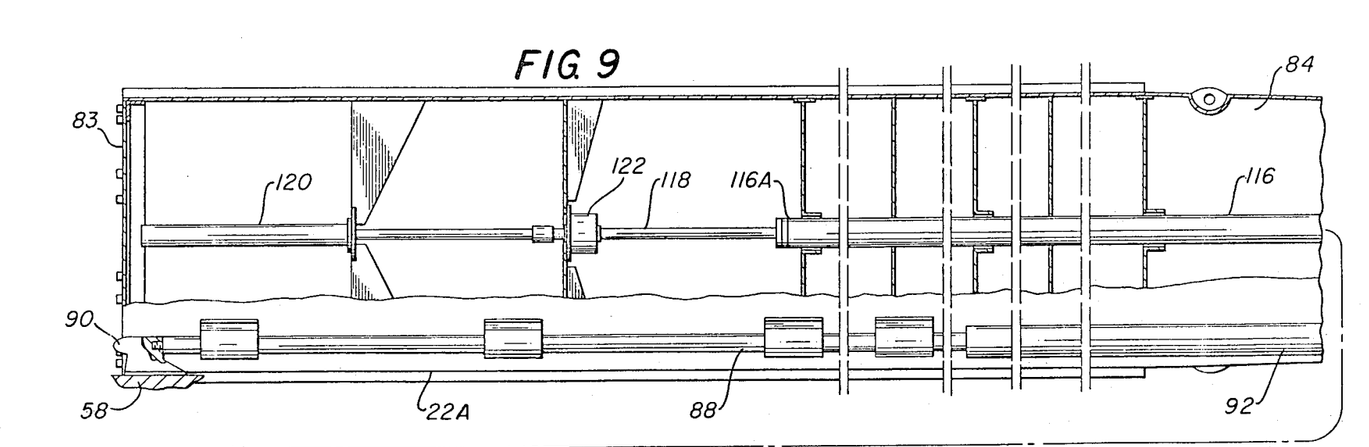
FIG. 9 is an elevation view, partly in section, of the aft boom section of the extendable fire boom.
Figure 13:
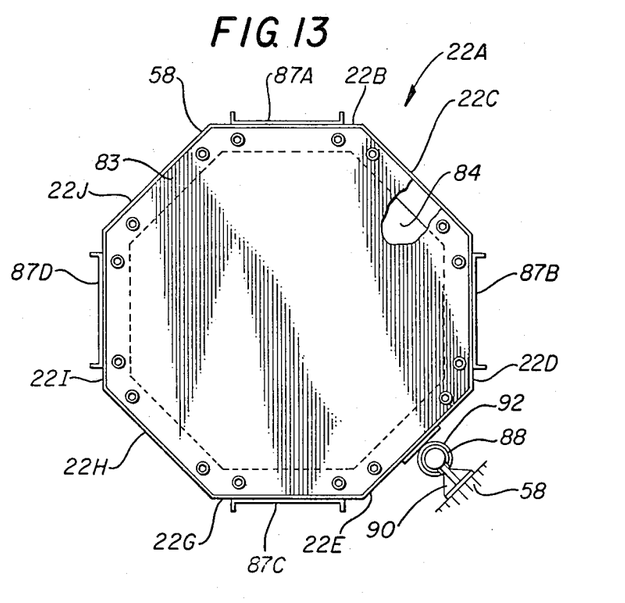
FIG. 13 is an end elevation view of the trunnion which supports the extendable boom of FIGS. 9 and 10.

Referring now to FIGS. 5, 7 and 13, the extendable boom 22 includes an aft boom section 22A and a forward boom section 22F. The utility boom assembly 22 is characterized by a polygon in cross-section, as can best be seen in FIG. 13, and in particular is formed by eight elongated panels 22B, C, D, E, G, H, I and J which are assembled together in edge abutting relation to define an octagon in transverse section. The aft section 22A is sealed by an end plate 83 and has a substantially constant diameter as measured from the centers of diametrically opposite panels. The forward section 22F is tapered in diameter along its length. As previously discussed, because of its heat dissipation properties and its high strength-to-weight ratio, this particular configuration is ideally suited for handling large loads in a high temperature environment. Also, according to this particular arrangement, the abutting side portions enclose and protect control apparatus for the utility claw assembly 30 in an interior chamber 84 (FIGS. 9 and 10).

The diameter of the aft boom section 22A is substantially constant and is supported for axial movement through the trunnion 58 by means of roller bearing elements 86A-86D which engage bearing plates 87A-87D (FIG. 13) on diametrically opposite side panels of the first boom section 22A and a second group of roller bearing elements 86E-86H (FIGS. 5, 6) which engage the bearing plates 87A-87D on opposite side panels of the aft boom section 22A at a location on the aft boom section which is axially spaced relative to the first roller bearing elements 86A-86D. This arrangement stabilizes axial movement of the fire boom 22 through the trunnion 58. The extendable fire boom 22 is moveable relative to the trunnion by means of a hydraulic linear actuator 88 as shown in FIG. 7 and which can best be seen in FIG. 9 of the drawing. The hydraulic linear actuator 88 includes a rod mount 90 which is attached to the trunnion 58 and a hydraulic cylinder 92 which is secured to one of the side panels of the aft boom section 22A as shown in FIG. 13.

An important capability of the extendable fire boom assembly 12 is its ability to retrieve equipment from the deck of an offshore platform. To carry out this function, the boom assembly 12 includes a winch 94 secured to the trunnion and a sheave 96 secured to the remote end of the forward section 22F of the extendable boom 22. A hoist line 98 includes a first end portion coupled to the winch 94 and a second end portion coupled in reeved engagement with the sheave 96. A hook 100 is attached to the second end portion of the hoist line 98 for lifting a load in response to actuation of the hydraulic winch 94. This arrangement can be used to good advantage for retrieving valuable equipment from the deck of an offshore platform which is threatened by fire or some other impending disaster.

Figure 10:
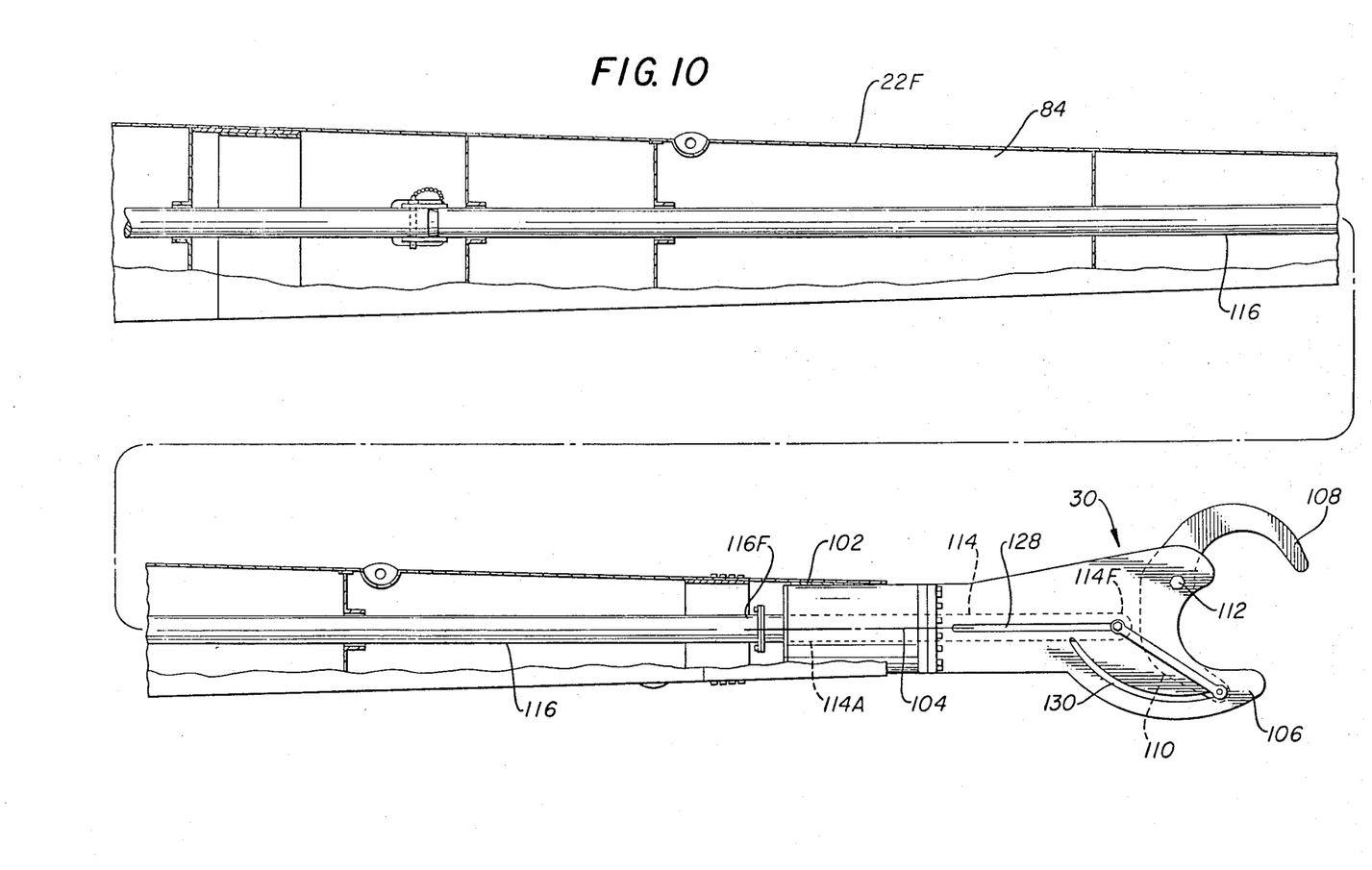
FIG. 10 is a view similar to FIG. 9 which illustrates the construction of the forward boom section of the extendable fire boom.

According to an important feature of the invention, the utility claw assembly 30 is attached to the remote end of the forward boom section 22F as shown in FIGS. 5, 6 and 10. The claw assembly 30 is coupled to the end of the forward boom section 22F by means of sleeve bearing elements 102 which permit rotational movement of the claw assembly 30 about the longitudinal axis 104 of the boom assembly 22 as shown in FIG. 4 of the drawing.

The utility claw assembly 30 includes a fixed jaw 106 and a moveable jaw 108 having a lever portion 110 mounted for pivotal movement relative to the fixed jaw 106 about a pivot pin 112. A moveable draw bar 114 is coupled to the claw assembly 30 for displacing the moveable jaw relative to the fixed jaw.

A draw tube 116 is mounted within the central chamber 84 of the boom 22 for axial displacement and rotation with respect to the longitudinal axis 104 of the boom. The draw tube has a forward end portion 116F connected to the draw bar 114 and an aft end portion 116A coupled to a draw rod 118. The draw tube serves as an intermediate element for transmitting axial and rotational forces to the utility claw assembly 30. A rotary actuator 122 is coupled to the draw rod 118 for driving the draw tube and utility claw assembly in rotation about the longitudinal axis 104. The rotary actuator 122 is of conventional hollow shaft construction for permitting the draw rod 118 and draw tube 116 to be driven in rotation about the longitudinal axis 104 while simultaneously permitting axial displacement of the draw tube 116 and draw rod 118 with respect to the rotary actuator 122 in response to the operation of the linear actuator 120.

Figure 11:
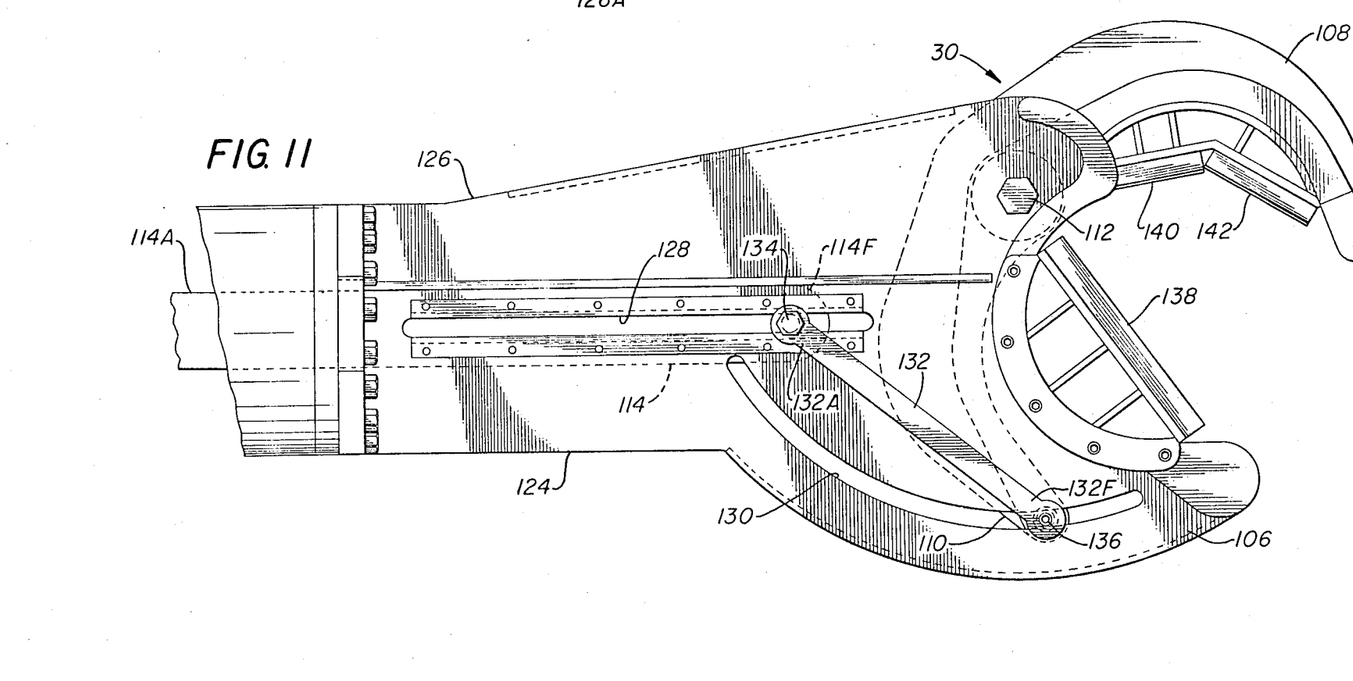
FIG. 11 is an elevation view which illustrates the construction of the utility claw assembly which is mounted on the forward boom section of FIG. 10.
Figure 12:
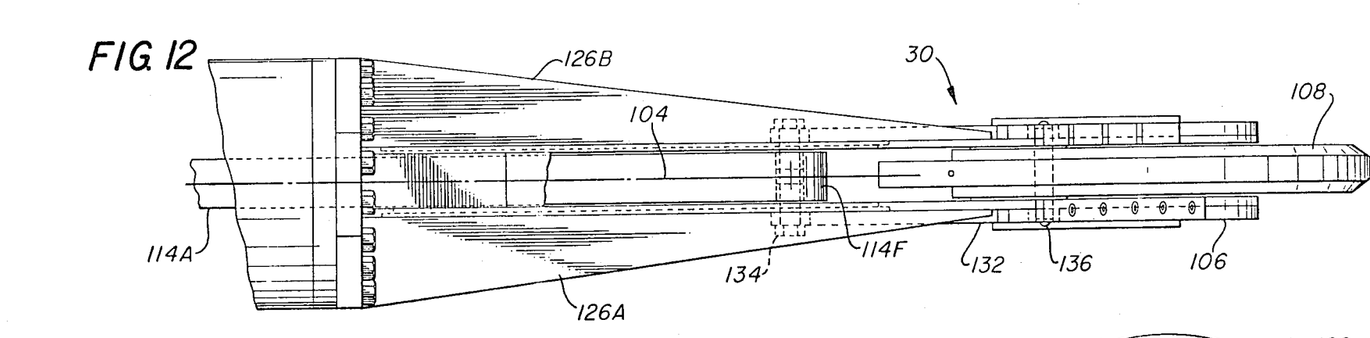
FIG. 12 is a plan view of the utility claw assembly shown in FIG. 11.

Turning now to FIGS. 11 and 12, the construction details of the utility claw assembly 30 are illustrated. The utility claw assembly 30 comprises generally a support arm 124 having an elongated shank 126. A straight slot 128 extends axially through the shank with the fixed jaw 106 projecting from one end of the shank and having a curved slot 130 extending along a curved path through the fixed jaw 106. The lever portion 110 of the moveable jaw 108 is pivotally connected to the support arm by the pin 112. The draw bar 114 has an aft end portion 114A coupled to the draw tube 116 and a forward end portion 114F disposed for movement along the straight slot 128.

A link bar 132 has an aft end portion 132A disposed for movement along the straight slot 128 and a forward end portion 132F disposed for movement along the curved slot 132. A bearing pin 134 is disposed within the straight slot 128 and pivotally connects the forward end portion 114F with the aft end portion 132A of the link bar 132. A bearing pin 136 is similarly disposed within the curved slot 130 and pivotally connects the forward end portion of the link bar 132F with the end portion of the link bar 132. It is preferred that the curved slot 130 follow an arc of constant radius having an origin of curvature which is concentric with the pivotal axis of the moveable jaw. It has been determined that this linkage arrangement permits a force transmitted by the draw bar 114 to be converted into a substantially constant rotary shear force as the moveable jaw is driven in rotational movement.

Since the utility claw assembly 30 is used for clearing structure from an offshore platform, a shear blade 138 is attached to the fixed jaw 106 with front and rear shear blades 140, 142 being attached to the moveable jaw 108. The function of the upper shear blades 140, 142 is to transmit a shearing force in response to a force conducted from the draw tube through the draw bar, link bar and lever. The function of the lower shear blade 138 which is mounted on the fixed jaw 106 is to transmit a reaction force in response to shear loading of an object seized between the fixed and moveable jaws.

Referring to FIG. 12, according to a preferred embodiment, the fixed jaw is symmetrical with respect to the longitudinal axis 104 and the support shank 126 is bifurcated with respect to the axis of symmetry. In this arrangement, the bifurcated shank 126 includes first and second shank portions 126A, 126B which are laterally spaced and disposed in parallel with each other, with the moveable jaw 108 and draw bar 114 being mounted in the space lying between the shank portions 126A and 126B.

Although preferred embodiments of the invention have been described in detail, it should be understood that various changes, substitutions, and alterations can be made therein without departing from the spirit and scope of the invention as defined by the appended claims.

What is claimed is:

1. An extendable utility boom assembly for performing work operations from a semi-submersible platform vessel comprising, in combination:

an extendable, elongated truss mounted for movement over the platform vessel from a stowed position to an operating position;
    track means extending along the length of said truss;
    a carriage assembly mounted for movement along the length of said track means;
    a supporting frame pivotally mounted on the carriage assembly for angular movement in a horizontal plane;
    a first linear actuator mounted on said carriage assembly and including an elongated drive assembly having teeth meshed with a circular gear secured to said supporting frame for driving said supporting frame in the horizontal plane;
    a boom housing pivotally mounted on the supporting frame for angular movement in a vertical plane, said boom housing having wall portions defining a central axis passageway;
    a second linear actuator interconnecting the boom housing and said supporting frame for displacing the boom housing about its axis in the vertical plane;
    an elongated utility boom having a first hollow boom section telescopically coupled in the passageway of said boom housing for reciprocal movement through the boom housing and a second hollow boom section projecting axially out of the boom housing; and,
    a third linear actuator interconnecting the boom housing and utility boom for reciprocating the utility boom along the axis of the boom housing.

2. In a semi-submersible service vessel of the type including a service deck from which marine service operations may be performed, the combination with said service deck of an extendable utility boom assembly for assisting firefighting operations performed upon an offshore platform, said extendable boom assembly comprising, in combination:

parallel rails mounted on the service deck;
    an extendable, elongated truss mounted on said rails for reciprocal movement over the deck of the service vessel from a stowed position to an operating position;
    first drive means coupled intermediate the service deck and the extendable truss for extending and retracting the truss along the rails;
    parallel tracks mounted on the extendable truss;
    a carriage assembly having rollers engaging the tracks for reciprocal movement along the length of the truss;
    second drive means coupled intermediate the extendable truss and the carriage assembly for extending and retracting the carriage assembly along the tracks;
    a supporting frame pivotally mounted on the carriage assembly for angular movement in a horizontal plane;
    a pair of spaced apart first linear actuators mounted on said carriage assembly each including an elongated drive assembly having teeth meshed with a circular gear secured to said supporting frame for driving said supporting frame in the horizontal plane;
    a boom housing pivotally mounted on the supporting frame for angular movement in a vertical plane, said boom housing having wall portions defining a central axial passageway;
    a pair of spaced apart second linear actuators interconnecting the boom housing and said supporting frame for displacing the boom housing about its pivotal axis in the vertical plane;
    an elongated utility boom having a first hollow boom section telescopically coupled in the passageway of said boom housing for reciprocal axial movement through the boom housing, and a second hollow boom section projecting axially out of the boom housing; and,
    a third linear actuator interconnecting the boom housing and utility boom for reciprocating the utility boom along the axis of the boom housing.

3. The combination as defined in claim 2, the first boom section including elongated panels having edge portions assembled together in abutting relation and being substantially constant in cross section along its length, and the second boom section being tapered in cross section along its length, the first boom section comprising a polygon in cross section having an even number of sides, the combination including an assembly of roller bearing elements mounted on the boom housing and engaging the first boom section for permitting reciprocal telescoping movement of the boom relative to the boom housing, said assembly of roller bearing assembly including a first pair of roller bearing elements engaging a first pair of diametrically opposite side panels of said first boom section, and a second pair of roller bearing elements engaging a second pair of diametrically opposite side panels of said first boom section at a location on said first boom section which is axially spaced relative to said first pair of roller bearing elements.

4. The utility boom assembly of claim 2, the combination including a winch coupled to the boom housing, a sheave secured to the end of the second boom section, a hoist line having a first end portion coupled to the winch and a second end portion coupled in reeved engagement with the sheave, and a hook attached to the second end portion of the hoist line for lifting a load in response to actuation of the winch.

5. An extendable utility boom assembly for performing work operations from a semi-submersible platform vessel comprising, in combination:

an extendable, elongated truss mounted for movement over the platform vessel from a stowed position to an operating position;
    track means extending along the length of said truss;

a carriage assembly mounted for movement along the length of said track means;

a supporting frame pivotally mounted on the carriage assembly for angular movement in a horizontal plane;

a first actuator interconnecting the carriage assembly and supporting frame for driving said supporting frame in the horizontal plane;

a boom housing pivotally mounted on the supporting frame for angular movement in a vertical plane, said boom housing having wall portions defining a central axial passageway;

a second actuator interconnecting the boom housing and supporting frame for displacing the boom housing about its axis in the vertical plane;

an elongated utility boom having a first hollow boom section telescopically coupled in the passageway of said boom housing for reciprocal movement through the boom housing, and a second hollow boom section projecting axially out of the boom housing, said utility boom including a plurality of elongated panels having edge portions assembly together in abutting relation, said panel assembly being characterized by a polygon in transverse section, said first boom section being substantially constant in cross-section along its length, and said second boom section being substantially straight and uniformly tapered in cross-section along its length toward a distal end of said second boom section; and, a third actuator interconnecting the boom housing and utility boom for reciprocating the utility boom along the axis of the boom housing.

6. A utility boom comprising:

a first elongated hollow boom section formed by eight elongated panels having edge portions assembled together in abutting relation defining an octagon in cross-section, said first boom section being substantially constant in cross-section along its length; a second elongated hollow boom section axially aligned with and attached to said first boom section, said second boom section being formed by eight elongated, tapered panels having edge portions assembled together in abutting relation defining an octagon in cross-section, said second boom section being tapered in cross-section along its length;

boom housing means by which said first boom section is mounted for longitudinal axial movement therethrough, said boom housing including fore and aft bearing means for supporting said first boom section; said fore and aft bearing means being spaced apart in the longitudinal direction of the first boom section, and each said bearing means comprising four rolling bearing means engaging the outer surface of the boom section and being equally spaced around the periphery thereof;

a utility tool connected to the free end of said second boom section;

a draw tube movably mounted in telescoping relation within said utility boom for reciprocal and rotary movement along the longitudinal axis of said second boom section, said draw tube being connected at the forward end of said utility boom to said utility tool to transmit motion thereto;

a linear actuator disposed in said utility boom and coupled between said utility boom and said draw tube for extending and retracting said draw tube relative to said second boom section, and a rotary actuator disposed in said utility boom and coupled to said draw tube for rotating said draw tube relative to said second boom section.

* * * * *